United States Patent
Kanasugi et al.

(10) Patent No.: US 10,525,800 B2
(45) Date of Patent: Jan. 7, 2020

(54) VEHICLE DOOR STRUCTURE

(71) Applicant: TOYOTA JIDOSHA KABUSHIKI KAISHA, Toyota-shi, Aichi-ken (JP)

(72) Inventors: Hideaki Kanasugi, Nisshin (JP); Yoshiki Miyamoto, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 40 days.

(21) Appl. No.: 16/022,159

(22) Filed: Jun. 28, 2018

(65) Prior Publication Data

US 2019/0047386 A1     Feb. 14, 2019

(30) Foreign Application Priority Data

Aug. 9, 2017   (JP) .................. 2017-154274

(51) Int. Cl.
*B60J 5/04* (2006.01)
*B60R 13/02* (2006.01)
*B62D 25/04* (2006.01)

(52) U.S. Cl.
CPC ............ *B60J 5/045* (2013.01); *B60J 5/0413* (2013.01); *B60J 5/0415* (2013.01); *B60R 13/0243* (2013.01); *B62D 25/04* (2013.01); *E05Y 2900/531* (2013.01)

(58) Field of Classification Search
CPC .... B60J 5/045; B60J 5/06; B60J 5/107; B60R 13/0243
USPC ...................................... 296/146.1
See application file for complete search history.

(56) References Cited

U.S. PATENT DOCUMENTS

| 4,254,318 A * | 3/1981 | Ohkawa ............... H04L 7/02 174/366 |
| 4,689,916 A * | 9/1987 | Shimizu ............... B60J 10/79 49/166 |
| 6,776,449 B2 * | 8/2004 | Komatsu .............. B60J 5/0405 296/146.5 |
| 9,623,731 B2 * | 4/2017 | Ikeda .................. B60J 5/10 |
| 9,713,949 B2 * | 7/2017 | Kamimura ............ B60J 5/107 |
| 2005/0150166 A1 | 7/2005 | Seksaria et al. |
| 2008/0092453 A1 * | 4/2008 | Fuetterer ............. B60J 5/0416 49/502 |
| 2016/0031299 A1 * | 2/2016 | Ikeda ................. B60J 5/102 49/502 |
| 2016/0052552 A1 * | 2/2016 | Yamamoto ........... B62D 25/025 296/187.1 |
| 2016/0052554 A1 * | 2/2016 | Ozawa ................ B62D 21/152 296/187.09 |

(Continued)

FOREIGN PATENT DOCUMENTS

| JP | 2004-122874 A | 4/2004 |
| JP | 2006-176107 A | 7/2006 |
| JP | 2009-126359 A | 6/2009 |

*Primary Examiner* — Pinel E Romain
(74) *Attorney, Agent, or Firm* — Oliff PLC (57) ABSTRACT

A cabin-interior upright wall of a door inner panel is configured by a first panel member alone. An extension wall extends toward a door outer panel from an end of the cabin-interior upright wall. A lower portion of a front upright wall, which is part of the extension wall, is segmented in a door thickness direction. The extension wall is configured such that a first extension portion of a first panel member is joined to a second extension portion of a second panel member in a state overlapped with the second extension portion.

4 Claims, 3 Drawing Sheets

(56) References Cited

U.S. PATENT DOCUMENTS

2018/0170451 A1\* 6/2018 Terada ................... B60J 5/0415
2018/0244319 A1\* 8/2018 Kiyoshita ............ B62D 21/152
2018/0265138 A1\* 9/2018 Nakayama ............. B62D 25/04

\* cited by examiner

VEHICLE DOOR STRUCTURE

CROSS-REFERENCE TO RELATED APPLICATION

This application claims priority under 35 USC 119 from Japanese Patent Application No. 2017-154274 filed on Aug. 9, 2017, the disclosure of which is incorporated by reference herein.

BACKGROUND

Technical Field

The present disclosure relates to a vehicle door structure.

Related Art

Vehicle doors made of an aluminum alloy that open or close off a door opening in a vehicle side section are known. For example, see Japanese Patent Application Laid-Open (JP-A) Nos. 2006-176107, 2009-126359, and 2004-122874. JP-A 2006-176107 discloses technology related to a vehicle sliding door that is configured including an inner panel and an outer panel respectively composed of aluminum (an aluminum alloy).

However, aluminum alloys are inferior to steel in formability when draw-forming. Thus, when a single aluminum alloy sheet is drawn to form an inner panel, the angle of the obtuse-angled bend between a cabin-interior upright wall configuring a door inner face of the inner panel and an extension wall that bends from an end of the cabin-interior upright wall so as to extend toward the outer side of the door (toward the outer panel) will be a large angle. However, when the angle of the obtuse-angled bend between the cabin-interior upright wall and the extension wall is a large angle, if a peripheral edge side of a door opening is correspondingly angled more sharply in the direction that the door opening becomes smaller on progression toward the vehicle width direction inner side, the door opening is reduced by a commensurate amount.

JP-A 2009-126359 discloses technology in which an inner panel made from an aluminum alloy is segmented into four: front, rear, upper, and lower segments. In this configuration, the angle of a bend between a location corresponding to the cabin-interior upright wall and a location corresponding to the extension wall can be made an angle equal to that of an inner panel made of steel. However, a location corresponding to the cabin-interior upright wall cannot be configured from a single member.

SUMMARY

The present disclosure obtains a vehicle door structure enabling the angle of a bend between a cabin-interior upright wall and an extension wall of a door inner panel made of an aluminum alloy to be set so as to suppress a reduction of the door opening of a vehicle side section due to being able to make the angle an angle equal to that when steel is used, and enabling the cabin-interior upright wall of the door inner panel to be configured from a single member.

In a first aspect of the present disclosure, a vehicle door structure includes a door outer panel and a door inner panel. The door outer panel is disposed on a vehicle-exterior side of a door that opens or closes off a door opening in a vehicle side section. The door inner panel is disposed at the vehicle-interior side of the door outer panel and together with the door outer panel forms a body of the door. The door inner panel includes a cabin-interior upright wall that configures a door inner face and an extension wall that extends toward the door outer panel from an end of the cabin-interior upright wall. The door inner panel is made from an aluminum alloy. The cabin-interior upright wall is configured by a first panel member alone. At least one portion of the extension wall is segmented in a door thickness direction, and the extension wall is configured such that a first extension portion of the first panel member, which bends from the end of the cabin-interior upright wall so as to extend toward the door outer panel, is joined to a second extension portion that is configured by a second panel member that is a separate member from the first panel member and that is provided on the door outer panel side of the at least one portion of the extension wall in a state overlapped with the second extension portion.

In the first aspect, a door body is formed by the door outer panel disposed on the vehicle-exterior side and the door inner panel disposed on the vehicle-interior side of the door outer panel. A door opening in a vehicle side section is opened or closed off by the door. The door inner panel is made from an aluminum alloy. The cabin-interior upright wall configuring the door inner face is configured by the first panel member alone. The extension wall extends toward the door outer panel from the end of the cabin-interior upright wall. At least one portion of the extension wall is segmented in the door thickness direction, and the extension wall is configured by the first extension portion of the first panel member and the second extension portion of the second panel member. The first extension portion is a location where the first panel member bends from the end of the cabin-interior upright wall so as to extend toward the door outer panel. The second extension portion is provided on the door outer panel side of the at least one portion, and is joined to the first extension portion in a state overlapped therewith. Thus, by draw forming the first panel member prior to joining the first panel member and the second panel member together, it is possible to make the draw depth of the first panel member suitably shallow even when the cabin-interior upright wall is configured by the first panel member alone. As a result, the angle of the bend between the cabin-interior upright wall and the extension wall can be made an angle equal to that of a door inner panel made of steel.

A second aspect of the present disclosure is the vehicle door structure of the first aspect, wherein the door is a sliding door configured to move toward a vehicle rear side to open the door opening, and a coupling between the first extension portion and the second extension portion is established at a front upright wall portion of the extension wall disposed at the vehicle front side and extending in a door vertical direction.

In the second aspect, the door is a sliding door that is moved toward the vehicle rear side to open the door opening, and the coupling between the first extension portion and the second extension portion is established at a front upright wall portion of the extension wall, disposed at the vehicle front side and extending in a door vertical direction. Accordingly, draw forming the first panel member prior to coupling the first panel member and the second panel member together enables the angle of the bend between the cabin-interior upright wall and the front upright wall portion to be made an angle equal to that of a door inner panel made of steel. The angle of the bend between the cabin-interior upright wall and the front upright wall portion is set to an angle equal to that of a door inner panel made of steel, and an upright wall portion configuring the vehicle front side of the door opening is set correspondingly. This makes it possible to reduce the difference between an amount of movement of the sliding door in the vehicle front-rear direction when the sliding door is moved toward the vehicle rear and opened, and a length in the vehicle front-rear direction from the vehicle front side edge of the door opening to the vehicle front side end of the sliding door. Namely, it is possible to efficiently secure an opening amount for getting into and getting out of the vehicle when the sliding door is opened.

A third aspect of the present disclosure is the vehicle door structure of the second aspect, wherein a weather strip is attached to the entire peripheral edge of the door opening. The weather strip is set so as to be pressed by an entire peripheral end side of the cabin-interior upright wall in a case in which the sliding door is in a state closing off the door opening.

In the third aspect, the weather strip is attached to the entire peripheral edge of the door opening. The weather strip is pressed by the entire peripheral end side of the cabin-interior upright wall when the sliding door is in a state closing off the door opening. The cabin-interior upright wall is configured by the first panel member alone, and is not a segmented structure. Thus, when the sliding door has closed off the door opening, gaps between the weather strip and the cabin-interior upright wall are favorably suppressed around the entire perimeter thereof. As a result, noise and vibration (NV) characteristics are improved in comparison to structures in which, for example, the cabin-interior upright wall is a segmented structure.

A fourth aspect of the present disclosure is the vehicle door structure of any one of the first aspect to the third aspect, wherein the second extension portion is provided to at least one end of the extension wall in a vehicle front-rear direction and extends in the door vertical direction, and the first extension portion is joined to the second extension portion in a state overlapped with an outer face side of the second extension portion.

In the fourth aspect, "overlapped with an outer face side of the second extension portion" means overlapped with a front face side of the second extension portion in the vehicle front-rear direction in a configuration in which the second extension portion is provided at a front-end side of the extension wall in the vehicle front-rear direction, and means overlapped with a rear face side of the second extension portion in the vehicle front-rear direction in a configuration in which the second extension portion is provided at a rear-end side of the extension wall in the vehicle front-rear direction.

In the fourth aspect, when a vehicle front-rear direction intermediate portion of the door collides with a pole-shaped object such as utility pole or a standing tree, the vehicle front-rear direction intermediate portion of the cabin-interior upright wall of the first panel member is pressed toward the vehicle cabin interior. Thus, when the cabin-interior upright wall of the first panel member attempts to deform so as to bend into a substantial V shape in vehicle plan view, the first extension portion of the first panel member coupled to the outer face side of the second extension portion of the second panel member attempts to displace toward the vehicle cabin interior as it presses on the second extension portion of the second panel member. Accordingly, the coupling between the first extension portion and the second extension portion is not liable to separate when a vehicle front-rear direction intermediate portion of the door collides with a pole-shaped object.

As described above, the vehicle door structure of the present disclosure enables the angle of a bend between a cabin-interior upright wall and an extension wall of a door inner panel made of an aluminum alloy to be set so as to suppress a reduction of the door opening of a vehicle side section due to being able to make the angle an angle equal to that when steel is used, and enables the cabin-interior upright wall of the door inner panel to be configured from a single member.

BRIEF DESCRIPTION OF THE DRAWINGS

Exemplary embodiments of the present invention will be described in detail based on the following figures, wherein.

DETAILED DESCRIPTION

Figure 1:
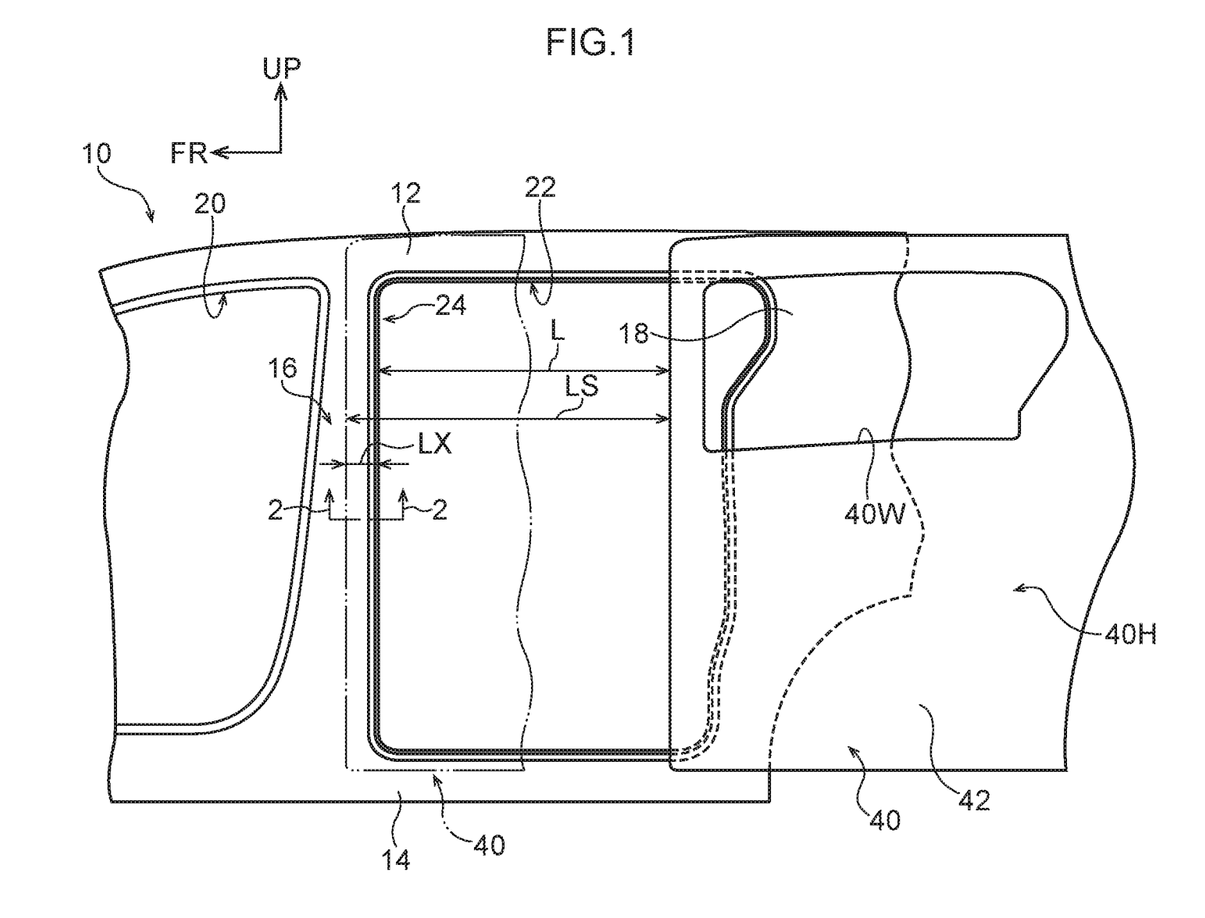
FIG. 1 is a side view schematically illustrating part of a vehicle side section provided with a vehicle door structure according to an exemplary embodiment of the present disclosure, with the outer contour of a front portion of a sliding door when in a closed state illustrated using double-dotted dashed lines.
Figure 2:
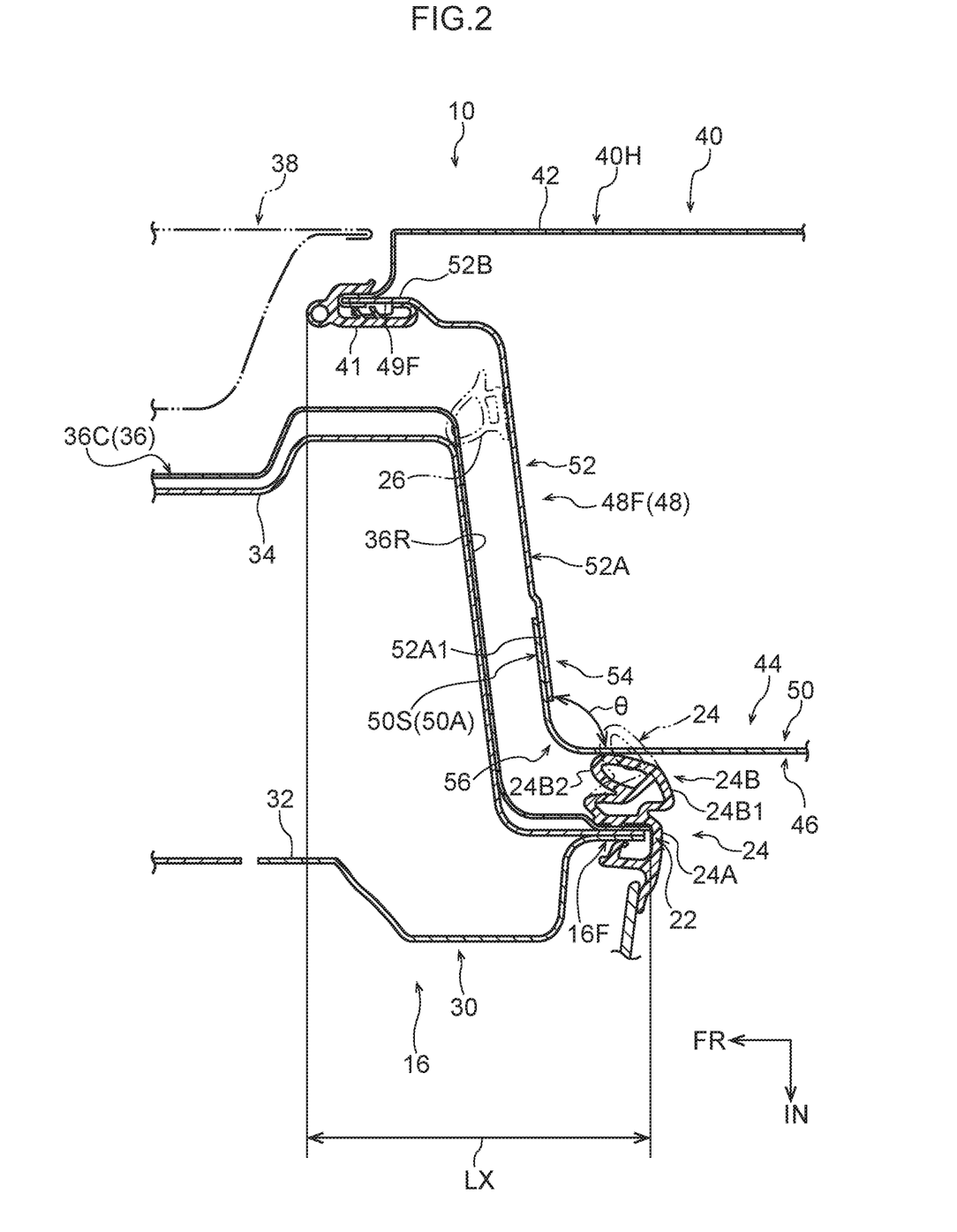
FIG. 2 is an enlarged horizontal cross-section taken along line 2-2 in FIG. 1 illustrating a front end portion of a sliding door, and the periphery thereof, when in the closed state illustrated in FIG. 1 by the double-dotted dashed lines.
Figure 3:
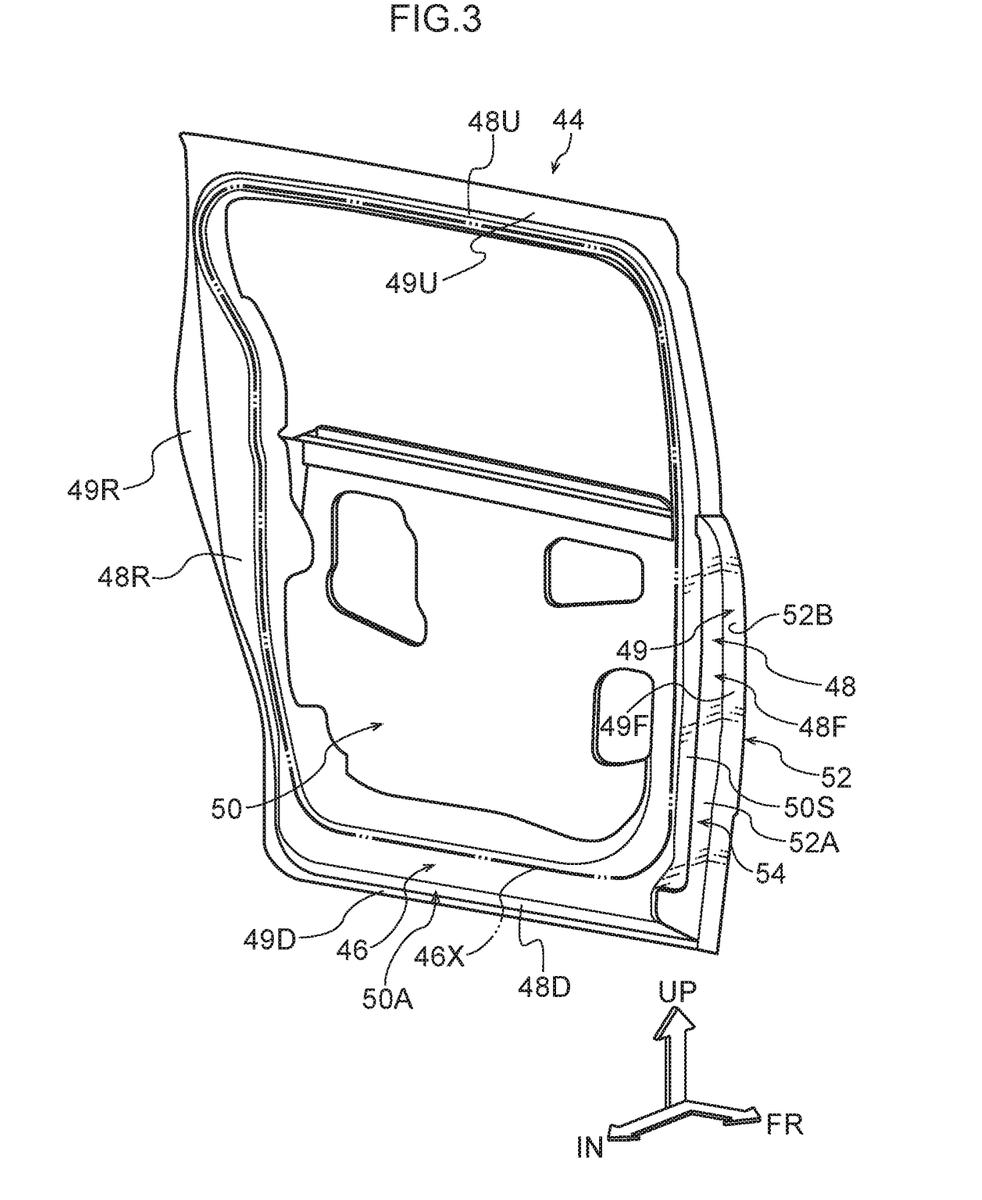
FIG. 3 is a perspective diagram illustrating an inner panel of the door illustrated in FIG. 1 as viewed obliquely from the front at the inside of the door.

Explanation follows regarding a vehicle door structure according to an exemplary embodiment of the present disclosure, with reference to FIG. 1 to FIG. 3. Note that in the drawings, the arrow FR indicates the vehicle front side, the arrow UP indicates the vehicle upper side, and the arrow IN indicates the vehicle width direction inner side, as appropriate. Further, in the following explanation, unless specifically stated otherwise, simple reference to the front and rear, upward and downward, and left and right directions refers to the front and rear in a vehicle front-rear direction, upward and downward in a vehicle vertical direction, and left and right when oriented in the direction of travel of the vehicle.

Configuration of Exemplary Embodiment

FIG. 1 is a side view schematically illustrating part of a vehicle side section 10 provided with a vehicle door structure according to the present exemplary embodiment. As illustrated in FIG. 1, a roof side rail 12 is disposed at an upper portion of the vehicle side section 10. The roof side rail 12 extends along the vehicle front-rear direction. A rocker 14 is disposed at a lower portion of the vehicle side section 10. The rocker 14 extends along the vehicle front-rear direction. A center pillar 16 is provided projecting toward the vehicle upper side at a length direction intermediate portion of the rocker 14. An upper end of the center pillar 16 is connected to a length direction intermediate portion of the roof side rail 12. A rear pillar 18 is provided projecting toward the vehicle upper side at the vehicle rear side of the center pillar 16. An upper end of the rear pillar 18 is connected to a rear end of the roof side rail 12.

The roof side rail 12, rocker 14, center pillar 16, and rear pillar 18 described above are all have a closed cross-section, and configure vehicle body framework members. A rear door opening 22 is formed at the rear side of the vehicle side section 10. The rear door opening 22 is a door opening bordered by vehicle body framework members including the roof side rail 12, the center pillar 16, the rocker 14, and the rear pillar 18. In other words, the roof side rail 12 is disposed running along the vehicle front-rear direction at the upper edge of the rear door opening 22, and the rocker 14 is disposed running along the vehicle front-rear direction at the lower edge of the rear door opening 22. Further, the center pillar 16 is disposed running along the vehicle vertical direction at the front edge of the rear door opening 22, and the rear pillar 18 is disposed running along the vehicle vertical direction at the rear edge of the rear door opening 22.

The rear door opening 22 places the inside of the vehicle cabin in communication with the outside of the vehicle cabin. The rear door opening 22 is opened or closed using a door configured as a sliding door 40 (described in detail later). In FIG. 1, the outer contour of a front portion of the sliding door 40 when in a closed state is illustrated using double-dotted dashed lines. Note that although a front door opening 20 is formed in a front portion of the vehicle side section 10 at the vehicle front side of the rear door opening 22, detailed description of the front door opening 20 will not be given. A weather strip (sometimes called an "opening weather strip") 24 is attached to the entire peripheral edge of the rear door opening 22.

FIG. 2 is an enlarged horizontal cross-section taken along line 2-2 in FIG. 1 illustrating the front end of the sliding door 40, and the periphery thereof, when in the closed state illustrated in FIG. 1 by the double-dotted dashed lines. Note that the member indicated by reference numeral 38 at the upper left of FIG. 2 is a door that opens or closes the front door opening 20 (see FIG. 1).

As illustrated in FIG. 2, the center pillar 16 includes a center pillar inner panel 32 and center pillar reinforcement 34. The center pillar inner panel 32 is disposed at the vehicle-interior side of the center pillar 16. The center pillar reinforcement 34 is disposed at the vehicle-exterior side of the center pillar inner panel 32. Note that in the following explanation, the center pillar inner panel 32 is abbreviated as "center pillar inner 32" and the center pillar reinforcement 34 is abbreviated as "center pillar RF 34". Note although only a location at the vehicle rear side of the center pillar 16 is illustrated in FIG. 2, a location at the vehicle front side of the center pillar 16 has a structure that is substantially front-rear symmetric with the location at the vehicle rear side of the center pillar 16.

Although there are indentations and protrusions in the vehicle width direction in horizontal cross-section, the center pillar inner 32 is configured as a member that in general extends along the vehicle front-rear direction. In contrast thereto, the center pillar RF 34 is formed with a substantially hat shaped profile in horizontal cross-section, with an opened portion facing the vehicle width direction inner side. A framework section 30 that extends along substantially the vehicle vertical direction and that has a closed cross-section profile is formed by coupling front and rear flanges of the center pillar RF 34 to front and rear flanges of the center pillar inner 32.

A center pillar outer portion 36C, which is part of a side outer panel 36, is disposed at the vehicle-exterior side of the center pillar RF 34, thereby configuring part of the center pillar 16. The center pillar outer portion 36C is formed with a substantially hat shaped profile in horizontal cross-section, with an opened portion facing the vehicle width direction inner side. Front and rear flanges of the center pillar outer portion 36C are coupled to the front and rear flanges of both the center pillar inner 32 and the center pillar RF 34. The center pillar 16 includes a pillar-rear upright wall 36R. The pillar-rear upright wall 36R is configured by part of the center pillar outer portion 36C, and extends in the vehicle vertical direction and substantially the vehicle width direction at a location at the vehicle rear side of the center pillar outer portion 36C.

The weather strip 24 is attached to a rear flange 16F of the center pillar 16 (a portion where the rear flanges of the center pillar inner 32, center pillar RF 34, and center pillar outer portion 36C overlap). The weather strip 24 is used to seal the rear door opening 22. The weather strip 24 is, for example, made of rubber, and includes an attachment base portion 24A and a seal portion 24B. The attachment base portion 24A of the weather strip 24 is attached at the peripheral edge of the rear door opening 22, including at the rear flange 16F of the center pillar 16. The seal portion 24B of the weather strip 24 is integrally formed to the attachment base portion 24A, and is disposed at the vehicle width direction outer side of the peripheral edge of the rear door opening 22, including at the rear flange 16F of the center pillar 16. In the present exemplary embodiment, the seal portion 24B is, for example, configured including a first tubular portion 24B1 and a second tubular portion 24B2 arranged alongside each other in the vehicle width direction. Note that the profile of the weather strip 24 illustrated by the double-dotted dashed lines indicates the profile of the weather strip 24 when the sliding door 40 is in an open state.

The sliding door 40 illustrated in FIG. 1 is an element that is also understood to be a rear door in the present exemplary embodiment. Moving the sliding door 40 toward the vehicle rear opens the rear door opening 22, and moving the sliding door 40 toward the vehicle front from the state illustrated using the solid lines in FIG. 1 closes off (see the double-dotted dashed lines in FIG. 1) the rear door opening 22. Note that the structure for allowing the sliding door 40 to slide is known, for example, as disclosed in JP-A No. 2003-214015, and so illustration and detailed description thereof will not be given. Further, although not illustrated in the drawings, the sliding door 40 includes a latch for a door lock located at the vehicle front side of the sliding door 40, and a corresponding striker (also not illustrated in the drawings) to engage with the latch is provided to the center pillar 16.

As illustrated in FIG. 2, the sliding door 40 includes a door body 40H (a body of the sliding door 40) formed from a door outer panel 42 and a door inner panel 44. The door outer panel 42 is disposed at the vehicle-exterior side of the sliding door 40 and configures a door exterior sheet. The door inner panel 44 is disposed at the vehicle-interior side of the door outer panel 42 and configures a door interior sheet. As illustrated in FIG. 1, a window section 40W in which door glass is disposed is formed in an upper portion of the door body 40H. The door outer panel 42 and the door inner panel 44 illustrated in FIG. 2 are made from an aluminum alloy. The door outer panel 42 and the door inner panel 44 are coupled together by hemming at outer peripheral edges of the door outer panel 42 and the door inner panel 44. Note that molding 41 is attached to the portion where the door outer panel 42 and the door inner panel 44 are coupled.

The door inner panel 44 includes a cabin-interior upright wall 46 that in general extends in the vehicle front-rear direction and in the vehicle vertical direction so as to configure a door inner face. Configuration is such that the weather strip 24 (see FIG. 1 and FIG. 2) is pressed by the entire peripheral end side of the cabin-interior upright wall 46 as illustrated in FIG. 3 when the sliding door 40 is in the state closing off the rear door opening 22 illustrated in FIG. 1. Note that the abutted portion where the weather strip 24

(see FIG. 1 and FIG. 2) is pressed by the peripheral edge of the cabin-interior upright wall 46 when the door is closed is illustrated using double-dotted dashed line 46X in FIG. 3.

As illustrated in FIG. 2, the door inner panel 44 includes an extension wall 48 that extends toward the door outer panel 42 from ends of the cabin-interior upright wall 46. As illustrated in FIG. 3, the extension wall 48 includes a front upright wall portion 48F and a rear upright wall portion 48R. The front upright wall portion 48F is disposed at the vehicle front side of the door inner panel 44 so as to extend in the vertical direction of the door. The rear upright wall portion 48R is disposed at the vehicle rear side of the door inner panel 44 so as to extend in the vertical direction of the door. The extension wall 48 also include an upper horizontal wall portion 48U and a lower horizontal wall portion 48D. The upper horizontal wall portion 48U is disposed at the vehicle upper side of the door inner panel 44 so as to extend in the vehicle front-rear direction. The lower horizontal wall portion 48D is disposed ad the vehicle lower side of the door inner panel 44 so as to extend in the vehicle front-rear direction.

As illustrated in FIG. 2, the front upright wall portion 48F of the door inner panel 44 is set so as to be disposed substantially parallel to the pillar-rear upright wall 36R of the center pillar 16 when the sliding door 40 is in a closed state. In other words, a portion of the center pillar 16 from the pillar-rear upright wall 36R to the rear flange 16F is bent so as to correspond to a portion of the sliding door 40 from the front upright wall portion 48F to the front end of the cabin-interior upright wall 46 when the sliding door 40 is in a closed state.

As illustrated in FIG. 3, the door inner panel 44 includes a flange 49 that juts out from an extended leading end of the extension wall 48 so as to extend toward the outer side of the door as viewed along a thickness direction of the door. The flange 49 includes a front flange portion 49F and a rear flange portion 49R. The front flange portion 49F is disposed at the vehicle front side of the door inner panel 44 so as to extend toward the vehicle front. The rear flange portion 49R is disposed at the vehicle rear side of the door inner panel 44 so as to extend toward vehicle rear. The flange 49 also includes an upper flange portion 49U and a lower flange portion 49D. The upper flange portion 49U is disposed at the vehicle upper side of the door inner panel 44 so as to extend toward the upper side of the vehicle. The lower flange portion 49D is disposed at the vehicle lower side of the door inner panel 44 so as to extend toward the lower side of the vehicle.

In the present exemplary embodiment, the door inner panel 44 is configured by two members: a first panel member 50 and a second panel member 52. The first panel member 50 configures a large part of the door inner panel 44. The second panel member 52 is a separate member to the first panel member 50. The cabin-interior upright wall 46 is configured by the first panel member 50 alone. A vehicle front side portion of the extension wall 48 is segmented in the door thickness direction, and is configured by coupling together part of the first panel member 50 and the second panel member 52. Namely, the extension wall 48 is not configured by a single member, rather, the extension wall 48 is configured as a segmented structure.

The extension wall 48 includes a first extension portion 50A. The first extension portion 50A is a location where the first panel member 50 bends from the end of the cabin-interior upright wall 46 so as to extend toward the door outer panel 42 (see FIG. 1). A short extension portion 50S is configured at the location where the first extension portion 50A configures a lower portion of the front upright wall portion 48F. The short extension portion 50S is set so as to extend less in the extension direction over its entire length than the lower portion of the front upright wall portion 48F extends in the extension direction. The position of the extended leading end of the short extension portion 50S is set so as to be toward the extension-direction base-end side of the front upright wall portion 48F in a plan view of the door. The extension wall 48 includes a second extension portion 52A. The second extension portion 52A is configured from the second panel member 52 and is provided on a door outer panel 42 (see FIG. 2) side of the lower portion of the front upright wall portion 48F. The extension wall 48 has a configuration in which the short extension portion 50S of the first extension portion 50A is joined to the second extension portion 52A in a state overlapped therewith. The second extension portion 52A extends toward the door outer panel 42 (see FIG. 2) side from a coupling 54 between the second extension portion 52A and the short extension portion 50S of the first extension portion 50A.

The short extension portion 50S of the first extension portion 50A, and the second extension portion 52A, are provided at the front-end side of the extension wall 48 in the vehicle front-rear direction and extend in the vertical direction of the door. Namely, in the present exemplary embodiment, the coupling 54 between the short extension portion 50S of the first extension portion 50A and the second extension portion 52A is established at the front upright wall portion 48F (more specifically, at the lower portion of the front upright wall portion 48F). Further, note that the lower end of the second extension portion 52A is joined to the vehicle front side end of the first extension portion 50A at a location configuring the lower horizontal wall portion 48D.

The lower portion of the front upright wall portion 48F where the coupling 54 between the short extension portion 50S and the second extension portion 52A is established (in other words, where a segmented structure is employed) is a location where the length of the front upright wall portion 48F is increased in length in the door thickness direction (the vehicle width direction). Further, an angle θ of the bend 56 between the cabin-interior upright wall 46 and the front upright wall portion 48F illustrated in FIG. 2 is set to an angle relatively close to 90° (for example, an angle greater than 90° but less than 100°), equal to that of a door inner panel made of steel, for example. In other words, the segmented structure made up of the short extension portion 50S and the second extension portion 52A is established at a portion where, supposing the door inner panel were to be configured from a single member made by deeply drawing an aluminum alloy, it would be difficult to obtain a bend angle equal to that when steel is used. The short extension portion 50S is joined to the second extension portion 52A in a state in which the short extension portion 50S is overlapped with an outer face side (a front face 52A1 side in the vehicle front-rear direction) of the second extension portion 52A. The coupling 54 between the short extension portion 50S and the second extension portion 52A is established at a location comparatively close to the bend 56 of rounded profile bending from the end of the cabin-interior upright wall 46 toward the door outer panel 42.

Note that in the vicinity of the vehicle width direction outer side of the short extension portion 50S, the second extension portion 52A is bent so as to have a cranked profile, and the front face of the short extension portion 50S is aligned with the front face of the second extension portion 52A at locations on the vehicle width direction outer side of the bent portion where the second extension portion 52A is bent into the cranked profile. Further, a weather strip 26 (illustrated using double-dotted dashed lines in the figures), for example, is affixed to the front face side of a vehicle width direction outer side portion of the second extension portion 52A, such that the weather strip 26 is pressed by the rear face of the pillar-rear upright wall 36R when the sliding door 40 is in a closed state. Note that the profile of the weather strip 26 in the figures is the profile of the weather strip 26 when the sliding door 40 is in an open state.

The second panel member 52 includes a flange 52B bending from the vehicle width direction outer side end of the second extension portion 52A so as to extend toward the vehicle front. As illustrated in FIG. 3, the flange 52B configures a lower portion of the front flange portion 49F. The upper end of the flange 52B is joined to a lower end of the first panel member 50 at a location configuring the front flange portion 49F. The lower end of the flange 52B is joined to the vehicle front side end of the first panel member 50 at a location configuring the lower flange portion 49D.

Explanation follows regarding functions of the exemplary embodiment described above.

In the aluminum alloy door inner panel 44, the cabin-interior upright wall 46 configuring the door inner face is configured by the first panel member 50 alone. The vehicle front side lower portion of the extension wall 48 extending from the end of the cabin-interior upright wall 46 toward the door outer panel 42 (see FIG. 2) is segmented in the door thickness direction. As illustrated in FIG. 2, the extension wall 48 has a configuration in which the first extension portion 50A of the first panel member 50 is joined to the second extension portion 52A of the second panel member 52 in a state overlapped therewith. Thus, by draw forming the first panel member 50 prior to joining the first panel member 50 and the second panel member 52 together, it is possible to make the draw depth of the first panel member 50 shallow even when the cabin-interior upright wall 46 is configured by the first panel member 50 alone. As a result, the angle θ of the bend 56 between the cabin-interior upright wall 46 and the extension wall 48 can be made an angle equal to that of a door inner panel made of steel.

Thus, since the vehicle door structure of the present exemplary embodiment enables the angle θ of the bend 56 between the cabin-interior upright wall 46 of the door inner panel 44 made from an aluminum alloy and the extension wall 48 to be made an angle equal to that when steel is used, a configuration is achieved in which a decrease in size of the rear door opening 22 (see FIG. 1) of the vehicle side section 10 is suppressed, and the cabin-interior upright wall 46 of the door inner panel 44 is configured by a single member (the first panel member 50).

In the present exemplary embodiment, the door that opens or closes off the rear door opening 22 illustrated in FIG. 1 is the sliding door 40, which is moved toward the vehicle rear to open the rear door opening 22. Further, as illustrated in FIG. 2 and FIG. 3, the coupling 54 between the short extension portion 50S of the first extension portion 50A of the first panel member 50 and the second extension portion 52A of the second panel member 52 is established at the front upright wall portion 48F disposed at the vehicle front side of the extension wall 48 and extending in the vertical direction of the door. Accordingly, draw forming the first panel member 50 prior to joining the first panel member 50 and the second panel member 52 together enables the angle θ of the bend 56 between the cabin-interior upright wall 46 and the front upright wall portion 48F illustrated in FIG. 2 to be made an angle equal to that of a door inner panel made of steel. The angle θ of the bend 56 between the cabin-interior upright wall 46 and the front upright wall portion 48F is set to an angle equal to that of a door inner panel made of steel, and an upright wall portion configuring the vehicle front side of the rear door opening 22 (the portion from the pillar-rear upright wall 36R to the rear flange 16F) is set correspondingly. This makes it possible to reduce the difference between an amount of sliding movement LS of the sliding door 40 in the vehicle front-rear direction when the sliding door 40 is slid toward the vehicle rear when opening as illustrated in FIG. 1, and a length L in the vehicle front-rear direction from the vehicle front side edge of the rear door opening 22 to the vehicle front side end of the sliding door 40. Namely, it is possible to efficiently secure an opening amount for getting into and getting out of the vehicle when the sliding door 40 is opened.

To explain further, the length L mentioned above when the sliding door 40 is slid toward the vehicle rear when opening is found from the difference between the amount of sliding movement LS of the sliding door 40 and a vehicle front-rear direction length LX from the vehicle front side end of the sliding door 40 to a rear end of the vehicle front side edge of the rear door opening 22 when the sliding door 40 is in a closed state. In the present exemplary embodiment, the angle θ of the bend 56 between the cabin-interior upright wall 46 and the front upright wall portion 48F illustrated in FIG. 2 is an angle equal to that of a door inner panel made of steel, and the upright wall portion configuring the vehicle front side of the rear door opening 22 (the portion from the pillar-rear upright wall 36R to the rear flange 16F) is set correspondingly. Thus, the length LX in the vehicle front-rear direction from the vehicle front side end of the sliding door 40 to a rear end of the vehicle front side edge of the rear door opening 22 when the sliding door 40 is in a closed state is suppressed. As mentioned above, this enables an opening amount for getting into and getting out of the vehicle to be efficiently secured when opening the sliding door 40 illustrated in FIG. 1, thereby enabling increased product appeal. Note that the length L is sometimes called a sliding door opening amount.

Moreover, in the present exemplary embodiment, the weather strip 24 is attached to the entire peripheral edge of the rear door opening 22. When the sliding door 40 has closed off the rear door opening 22, the weather strip 24 (see FIG. 1 and FIG. 2) is pressed by the entire peripheral end side (see double-dotted dashed line 46X) of the cabin-interior upright wall 46 illustrated in FIG. 3. The cabin-interior upright wall 46 does not have a segmented structure and is configured by the first panel member 50 alone. Thus, when the sliding door 40 illustrated in FIG. 1 has closed off the rear door opening 22, gaps between the weather strip 24 and the cabin-interior upright wall 46 illustrated in FIG. 3 are favorably suppressed around the entire perimeter thereof. As a result, noise and vibration (NV) characteristics are improved in comparison to structures in which, for example, the cabin-interior upright wall is a segmented structure.

Moreover, in the present exemplary embodiment, the short extension portion 50S illustrated in FIG. 2 is joined to the second extension portion 52A in a state overlapped with the outer face side (the front face 52A1 side in the vehicle front-rear direction) of the second extension portion 52A. In the present exemplary embodiment, when a vehicle front-rear direction intermediate portion of the sliding door 40 collides with a pole-shaped object such as utility pole or a standing tree, the vehicle front-rear direction intermediate portion of the cabin-interior upright wall 46 of the first panel member 50 is pressed toward the vehicle cabin interior (vehicle width direction inner side). Thus, when the cabin-interior upright wall 46 of the first panel member 50 attempts to deform so as to bend into a substantial V shape in vehicle plan view, the short extension portion 50S of the first panel member 50 attempts to displace toward the vehicle cabin interior as it presses on the second extension portion 52A of the second panel member 52. Accordingly, the coupling 54 between the short extension portion 50S and the second extension portion 52A is not liable to separate when a vehicle front-rear direction intermediate portion of the sliding door 40 collides with a pole-shaped object.

Moreover, in the present exemplary embodiment, since the short extension portion 50S and the second extension portion 52A are joined together in an overlapped state, sheet thickness is increased at the overlapped coupling. Thus, for example, rigidity is improved against load in the vehicle front-rear direction when closing the sliding door 40.

Supplementary Explanation of the Exemplary Embodiment

Note that although the above exemplary embodiment was described with respect to a case in which the door was a sliding door 40, the exemplary embodiment may, for example, be applied to a swinging door configured substantially similarly to the door outer panel 42 and the door inner panel 44 in the above exemplary embodiment.

Further, in the above exemplary embodiment, although the lower portion of the front upright wall portion 48F of the extension wall 48 illustrated in FIG. 3 is configured segmented in the door thickness direction, and the segmented first extension portion 50A and second extension portion 52A are joined together in an overlapped state, at least one portion of an extension wall may be segmented in the door thickness direction, and segmented first and second extension portions thereof joined together in an overlapped state. "At least one portion" may include a portion configuring a rear upright wall portion (48R), may include a portion configuring a lower horizontal wall portion (48D), and may include a portion configuring an upper horizontal wall portion (48U). For example, the extension wall may be segmented in the door thickness direction at a lower portion of the front upright wall portion (48F) and a lower portion of the rear upright wall portion (48R), respectively, and segmented first and second extension portions thereof joined together in an overlapped state. In another example, the entire extension wall may be segmented in the door thickness direction, and segmented first and second extension portions thereof joined together in an overlapped state.

Further, without modifying the configuration of the front upright wall portion 48F of the door inner panel 44 of the above exemplary embodiment, or without segmented a portion corresponding to the front upright wall portion 48F of the door inner panel 44 (i.e., by forming in a single piece), a configuration may be adopted in which the configuration illustrated in FIG. 2 is reversed front to rear. Namely, a configuration may be adopted in which the second extension portion is provided at the vehicle front-rear direction rear-end side of the extension wall so as to extend in the vertical direction of the door, and the first extension portion is joined to the outer face side (rear face side in the vehicle front-rear direction) of the second extension portion in a state overlapped therewith.

Further, in a modified example of the above exemplary embodiment, in place of a configuration in which the weather strip 24 is attached to the entire peripheral edge of the rear door opening 22, a configuration may be adopted in which a weather strip is attached to the entire periphery of a cabin-interior upright wall (46).

Note that the above exemplary embodiment and the plural modified examples described above may be combined and implemented as appropriate.

Explanation has been given regarding examples of the present disclosure. However, the present disclosure is not limited to the above, and obviously various other modifications may be implemented within a range not departing from the spirit of the present disclosure.

What is claimed is:

1. A vehicle door structure comprising:
a door outer panel that is disposed on a vehicle-exterior side of a door that opens or closes off a door opening in a vehicle side section; and
a door inner panel that is disposed at the vehicle-interior side of the door outer panel and that together with the door outer panel forms a body of the door, the door inner panel including a cabin-interior upright wall that configures a door inner face and an extension wall that extends toward the door outer panel from an end of the cabin-interior upright wall,
the door inner panel being made from an aluminum alloy,
the cabin-interior upright wall being configured by a first panel member alone, and
at least one portion of the extension wall being segmented in a door thickness direction, and the extension wall being configured such that a first extension portion of the first panel member that bends from the end of the cabin-interior upright wall so as to extend toward the door outer panel is joined to a second extension portion that is configured by a second panel member that is a separate member from the first panel member and that is provided on the door outer panel side of the at least one portion of the extension wall in a state overlapped with the second extension portion.

2. The vehicle door structure of claim 1, wherein:
the door is a sliding door configured to move toward a vehicle rear side to open the door opening; and
a coupling between the first extension portion and the second extension portion is established at a front upright wall portion of the extension wall disposed at the vehicle front side and extending in a door vertical direction.

3. The vehicle door structure of claim 2, wherein:
a weather strip is attached to the entire peripheral edge of the door opening; and
the weather strip is set so as to be pressed by an entire peripheral end side of the cabin-interior upright wall in a case in which the sliding door is in a state closing off the door opening.

4. The vehicle door structure of claim 1, wherein:
the second extension portion is provided to at least one end of the extension wall in a vehicle front-rear direction and extends in the door vertical direction, and the first extension portion is joined to the second extension portion in a state overlapped with an outer face side of the second extension portion.

* * * * *